United States Patent [19]
Demeure

[11] Patent Number: 4,604,736
[45] Date of Patent: Aug. 5, 1986

[54] DIGITAL DEVICE FOR THE FORMATION OF SONAR CHANNELS

[75] Inventor: Alain Demeure, Meudon, France
[73] Assignee: Thomson CSF, Paris, France
[21] Appl. No.: 544,412
[22] Filed: Oct. 21, 1983
[30] Foreign Application Priority Data
Oct. 22, 1982 [FR] France .................. 82 17742
[51] Int. Cl.$^4$ .................................. G01S 3/82
[52] U.S. Cl. .................... 367/123; 367/103
[58] Field of Search ................ 367/103, 123

[56] References Cited

U.S. PATENT DOCUMENTS

| | | | |
|---|---|---|---|
| 4,001,763 | 1/1977 | Kits van Heyningen | 340/6 R |
| 4,074,223 | 2/1978 | Eggleton et al. | 340/1 R |
| 4,170,766 | 10/1979 | Pridham et al. | 367/123 X |
| 4,267,584 | 5/1981 | McKeighen et al. | 367/103 |
| 4,325,257 | 4/1982 | Kino et al. | 367/123 X |
| 4,336,607 | 6/1982 | Hill et al. | 367/123 |

FOREIGN PATENT DOCUMENTS 2472753 7/1981 France .

OTHER PUBLICATIONS

IBM Tech. Disc. Bull., vol. 24, No. 11A, Apr. 1982, by Pierce et al, pp. 5716–5723.

*Primary Examiner*—Richard A. Farley
*Attorney, Agent, or Firm*—Cushman, Darby & Cushman

[57] ABSTRACT

A digital device for forming spatial channels for sonar equipment having a sonar transducer array including N sensors. Signals from the N sensors are sampled and multiplexed in series. A memory having a plurality of memory blocks stores the samples of the sensor signals. The memory blocks may conveniently be divided into two groups. The group acquires samples during a time interval $T_c$ from the N multiplexed signals. Each memory block thus stores P groups of N samples. The samples stored in one memory block are then transferred to the next block. Finally, the samples stored in each memory block of the first group are transferred into the corresponding memory block of the second group in which the delayed samples are read and summed to deliver simultaneously Q time samples of the same spatial channel.

15 Claims, 8 Drawing Figures

FIG.1 PRIOR ART
FIG.2 PRIOR ART
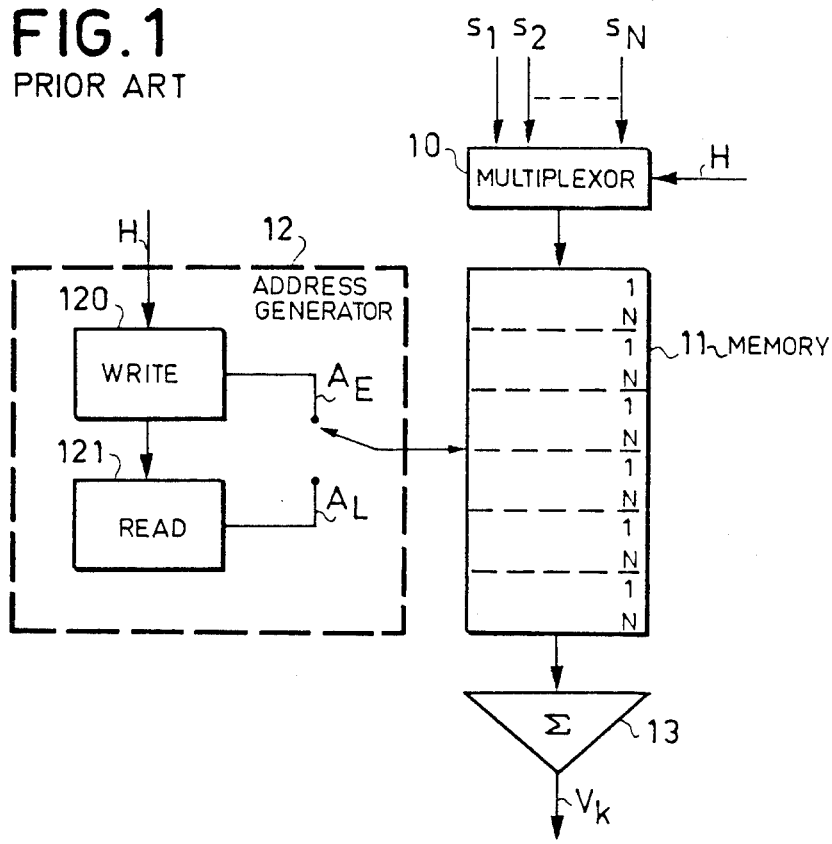
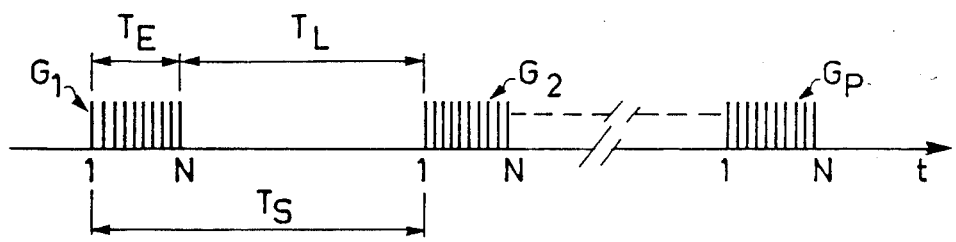

DIGITAL DEVICE FOR THE FORMATION OF SONAR CHANNELS

BACKGROUND OF THE INVENTION

1. Field of the Invention

The present invention relates to devices for the formation of sonar channels having a wide frequency band. These channels are formed by compensating in each channel for geometrical delays of signals received by the different sensors which form the sonar transducer array. The invention relates to formation of channels by digital techniques.

This invention is more particularly applicable to a ship or submarine sonar system in which provision is made for an acoustic transducer array having little or no symmetry.

2. Description of the Prior Art

It is a known practice to form so-called angular or spatial channels for a sonar transducer array having N sensors by means of a digital device comprising means for storing signals, an address computer and a summing device. The N signals received by these sensors are digitized and multiplexed. In a first step, the digital samples are written in a volatile memory of the random-access or RAM type. A predetermined number P of groups of N successive samples are thus written at the corresponding NP addresses. In a second step, the delayed samples are read in said memory at the correct addresses by means of the computer and are summed so as to form a channel.

In order to form a large number of channels by means of this prior-art device, it is necessary to employ a large number of formation circuits in parallel.

SUMMARY OF THE INVENTION

The device in accordance with the present invention has an advantage over the prior art device in that it permits the use of an address generator which is common to all the computing circuits, thus considerably reducing the volume of equipment which is necessary in comparison with the prior art.

In brief outline, the invention is concerned with a digital device for the formation of spatial channels for a sonar set having an acoustic transducer array having N sensors, the N signals received by said N sensors being time-multiplexed and sequentially delivered in groups of N samples to means which serve to store said samples and which are composed of a plurality of volatile memories designated as block memories; addressing means for writing and reading said samples in said block memories; and means for summing samples read from said block memories, in which are stored a plurality of groups of N samples. The device is distinguished by the fact that the block memories receive the same addressing simultaneously in order to deliver a plurality of time samples of one and the same channel at the output of the summing means.

BRIEF DESCRIPTION OF THE DRAWINGS

FIG. 1 illustrates a device for the formation of digital channels in accordance with the prior art.

FIG. 2 is a time representation of read/write cycles for the device in accordance with the prior art.

DETAILED DESCRIPTION OF THE INVENTION

Figure 3:
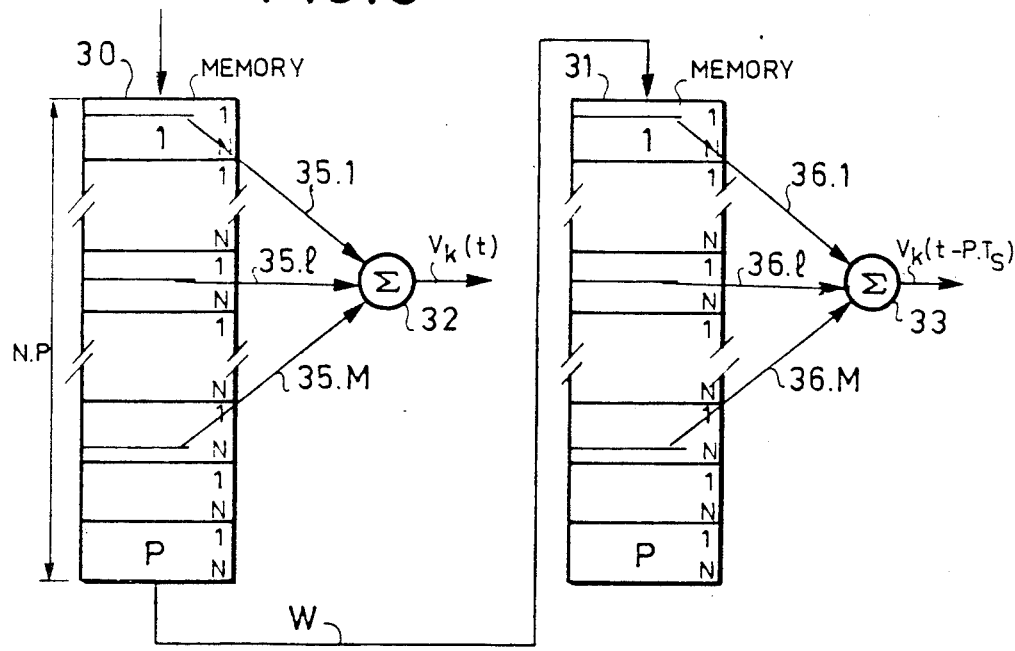
FIG. 3 is an explanatory diagram for the formation of channels in accordance with the invention.

It is known that the surveillance of an angular sector by a sonar is carried out by forming a plurality of directive channels pointed in predetermined directions and uniformly spaced.

Each formed channel is adapted to a particular direction having an index k for which the electrical delays introduced by the channel formation permit resynchronization of the signals derived from the different sensors of the antenna when a plane wave (or a spherical wave if the sonar transducer array is intended to operate in a near field) comes from the direction designated by the index "k".

After introduction of the electrical delays, the reception signals are weighted in amplitude and added, hence:

$$V_k(t) = \Sigma_i A_{ik} \cdot s_i(t - \tau_{ik}) \tag{1}$$

where $V_k(t)$ is the time signal of the channel "k" computed at the instant t, $s_i(t)$ is the time signal received by the sensor having an index "i" at the instant t, $A_{ik}$ is an amplitude weighting coefficient which, in certain applications, is solely dependent on the index "i", $\tau_{ik}$ is the electrical delay applied to the signal of the sensor "i" in order to form the channel "k".

FIG. 1 is a block diagram for the formation of channels in accordance with the prior art. The digital samples of the signals $s_1, \ldots s_i, \ldots s_N$ delivered by the N sensors are multiplexed sequentially in a multiplexer 10 controlled by a clock signal H and are stored in a volatile random-access or RAM-type memory 11. An address generator 12 delivers the write addresses $A_E$ and read addresses $A_L$ to the memory 11. Said memory operates alternately in the writing mode and in the reading mode. The writing mode corresponds to acquisition of the N samples at the output of the multiplexer 10. The reading mode is employed for computation of the channels obtained at the output of a summing device 13 which receives the samples read from the memory 11 at the storage addresses of samples having the necessary delays for the channel to be formed.

FIG. 2 shows the read/write sequencing of the memory. The period $T_S$ represents the period of sampling of each sensor signal. The time interval $T_E$ corresponds to the duration of writing of the N samples and the reading time is $T_L = T_S - T_E$.

In the writing mode, the memory is controlled so as to ensure that, between two periods $T_S$, the write address $A_E$ is incremented by N, the samples being stored successively, starting from this address. The memory 11 is thus filled with a succession of P groups $G_1, \ldots G_p$ of N samples separated by a time interval $T_S$. Let $\tau_{max}$ be the highest compensated value of the delays $\tau_{ik}$. It is postulated that $A = \tau_{max}/T_S$. This value of A will hereinafter be designated as the transducer array depth. In order to form all the channels, it must be ensured that $P \geq A$.

The write addresses $A_E$ for the P groups of N samples are supplied by a counter 120 which receives the clock signals H.

In the reading mode, a signal sample of channel "k" is formed by reading one sample of each sensor "i" in the groups corresponding to the delays $\tau_{ik}$. To this end the address generator 121 delivers to the memory 11 the read addresses $A_L$ of the M samples required in order to form a channel sample since it is usually only necessary to employ only a part of the N sensors of the tranducer array in order to form each channel. The address generator 121 performs the addition of the write address, which is incremented by one unit at each sampling period $T_S$ of the input signal, with the quantized delays $\tau_{ik}$ which are read from a random-access read-only memory of the PROM type. This delay-storage memory also delivers the index i of the sensor to be employed at each step of the computation and may also supply the amplitude weighting $A_{ik}$ to be applied to the signals $s_1, \ldots s_N$ of the sensors prior to summation, in accordance with relation (1). Each signal $V_k(t)$ as defined in accordance with said relation (1) constitutes what is known as a time sample at the instant t of the spatial channel k.

For each channel, it is necessary to obtain at least one sample of this type during a period $T_\nu$, where $T_\nu$ corresponds to Shannon's rule: $T_\nu = \frac{1}{2}B$, where B is the requisite passband. The sampling period $T_S$ is determined by the precision which is necessary for the delays and is usually such that $T_S \leq T_\nu$.

The result thereby achieved is that during the reading-computation time interval $T_L$, it is possible to compute only K channels, where K is given by the relation:

$$K < \frac{1}{M} \cdot \frac{T_\nu}{T_S} \left[ \frac{T_S}{t_o} - N \right] \quad (2)$$

where M is the number of samples taken in order to form one channel and $t_o$ is the time-duration of the elementary cycle when reading or writing in the memory 11. By way of example, if the following values are adopted:
N = 64,
M = 24,
$T_S = 16$ μs,
$T_\nu = 32$ μs and
$t_o = 0.125$ μs;
we find:
K = 5.

In order to form a greater number of channels, the method of the prior art entails the need to employ a number of devices in parallel and each memory stores samples from identical sensors for a length of time which is equal, as before, to the transducer array depth.

If the transducer array has circular symmetry, the different computation circuits can be controlled by the same address generator. However, if the preformed channels have to be stabilized by correcting the movements of the transducer array such as rolling and pitching movements, for example, the circular symmetry disappears. In the case of any given transducer array, there will therefore be a number of address generators such as the generator 12 corresponding to the number of formation circuits, a formation circuit being defined as the assembly consisting of memory 11 and summing device 13. At the present time, however, the number of components of an address generator is two to three times the number of components of a formation circuit, thus resulting in substantial volumes of equipment.

The digital channel-formation device in accordance with the invention permits a reduction in equipment volume even in the case of transducer arrays of any shape or form and in the case of stabilization of channels in the event of movement of the platform which supports the transducer array.

In accordance with the invention, a special arrangement of the memory units and the storage of a signal time slice or interval greater than the transducer array depth make it possible to obtain simultaneously a plurality of time samples from the same spatial channel during the same addressing of these memories.

Provision is made for only a single address generator which is therefore of much more simple design than the generator required in order to form a plurality of spatial channels simultaneously in accordance with the prior art.

In FIG. 3, there are shown two memories 30 and 31 connected in series and each associated with a summing device 32 and 33 respectively. Let P be the number of groups of N samples (the number is determined by the size of memory module chosen) contained within each of these memories. The time interval corresponding to each memory is therefore $PT_S$. It is considered that the samples stored in these two memories correspond to two successive time intervals. Therefore at the same address the two memories contain samples of the same transducer array sensor of index i, but the ages of which differ by $PT_S$. This can be achieved, for example, by supplying the memory 31 "in series" via the output W of the memory 30.

In other words, the samples contained in the memory 30 are more recent than those contained in the memory 31, corresponding to the time interval $PT_S$.

In order to form a sample of a channel, it is necessary to provide samples of M sensors, this number being usually smaller than the total number N of sensors, the addresses of which are at a maximum distance of $N \times A$, where A is the transducer array depth evaluated in number of periods $T_S$.

Referring to FIG. 3, a sample of the channel having a direction k relative to an instant t is formed by addition of M samples 35.1, . . . 35.1 . . . 35.M collected successively in the memory 30 at addresses $AD_L$ which depend on the index i of each sensor, on the index k of the channel and also on $t/T_S$. The same addresses applied to the memory 31 permit computation of a channel sample having the same direction k but at the instant $t - PT_S$ by collecting the samples 36.1, . . . 36.1, . . . 36.M. This principle can be extended to Q formation circuits controlled by a single address generator. Each memory is employed for calculating intermediate samples of each channel of index k in respect of sampling instants having a uniform spacing of $T_\nu$ within a period $PT_S$, where $T_\nu$ is a multiple of $T_S$ and a sub-multiple of $PT_S$. The ratio $T_\nu/T_S$ is a whole number usually within the range of 2 to 8.

By reason of the transducer array depth and the fact that the memories of the type 30 and 31 contain adjacent time intervals, each weighting and addition circuit must in fact have access to at least two adjacent memories, thus entailing the need to place memory-selecting circuits and to have at least Q+1 available memories. The memory-selecting circuits are controlled in synchronism by the address generator. If the transducer array depth is greater than $PT_S$, each summing circuit must have access to more than two memories.

Figure 5:
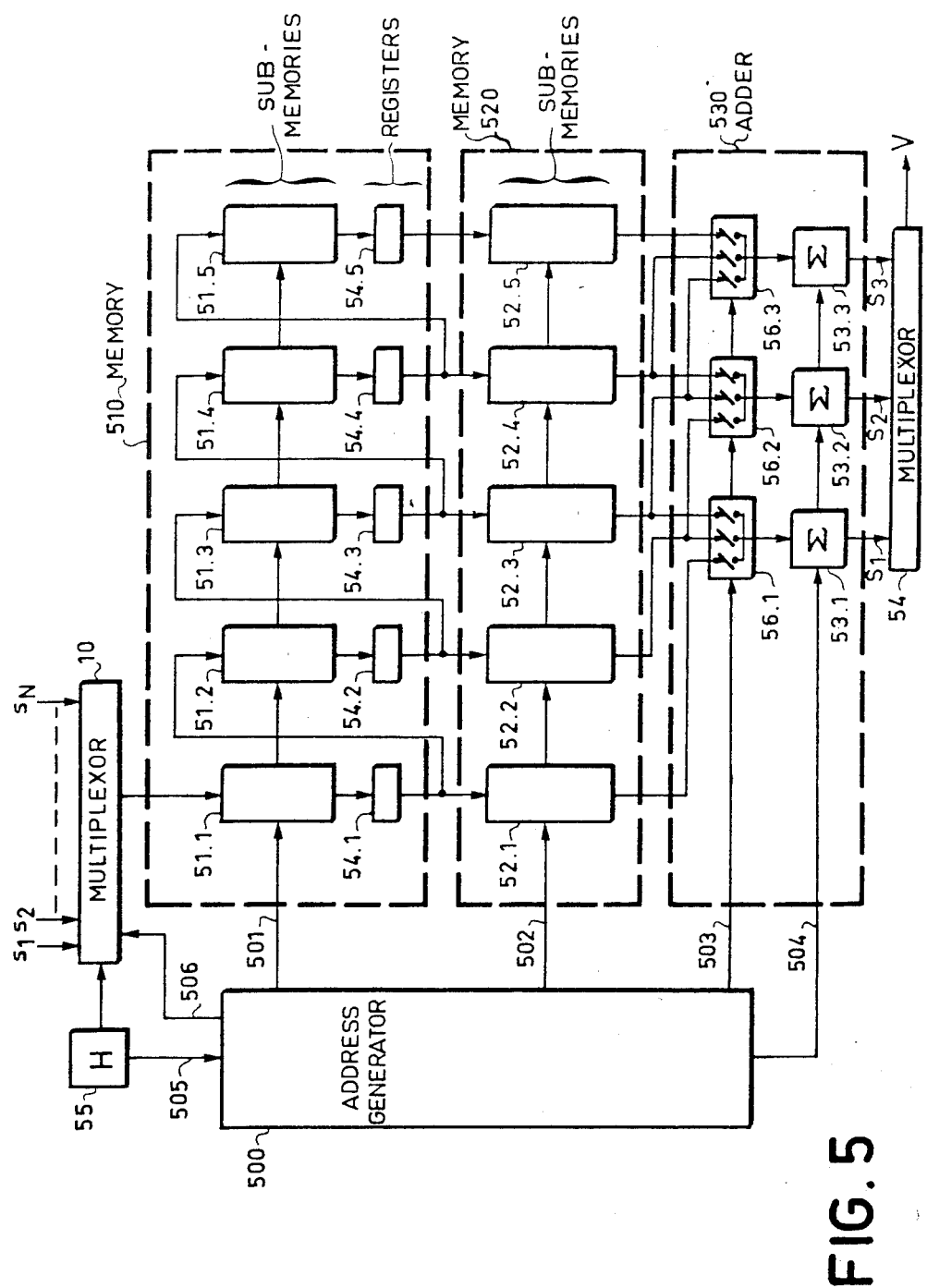
FIG. 5 illustrates one example of construction of a channel formation device in accordance with the invention.

One example of the channel formation device in accordance with the invention is shown in FIG. 5.

The device comprises an address generator 500, two RAM-type volatile memories 510 and 520 designated respectively as an acquisition memory and a formation memory, and a summing unit 530.

The two memories 510 and 520 and the summing unit 530 are so arranged as to constitute a number of formation circuits equal to the number of operators 53.1, 53.2 and 53.3 of the unit 530. An operator is the circuit which performs the operations $\Sigma_i A_{ik}s_i$ in accordance with relation (1). The figure corresponds by way of example to Q=3. Each memory comprises B memory blocks: 51.m and 52.m, with m≦B. The number B>Q depends on the ratio of the duration P of elementary intervals to the transducer array depth A counted in periods of $T_S$. In FIG. 5, the value B=5 has been adopted.

The output of each block 51.m of the acquisition memory is connected to the input of the corresponding block 52.m of the formation memory. The samples of the sensors delivered by the multiplexer 10 are written into the acquisition memory 510. The samples of the sensors are read from the formation memory 520 and the outputs of the blocks of said memory are connected to the summing unit 530. The address generator 500 is common to the two memories 510 and 520 and supplies to these latter the addresses and the read/write control signals.

The acquisition memory 510 is designed as a delay line having one input and B outputs (B=5). In FIG. 5, the age of the samples increases from left to right: the first block receives in series the samples of the sensors and said samples are transferred from one block to the adjacent block located immediately on the right. These transfers are carried out sample by sample in elementary read/write cycles: during the read cycle, reading takes place in the memory blocks 51.1 . . . 51.B and one sample per block is stored simultaneously in buffer registers 54.1 . . . 54.B. During the write cycle, one sample is written into each block 51.1, . . . 51.B. The addressing operation which is common to all the blocks is carried out by incrementation of 1 (modulo P×N) after each writing operation.

The number B of memories which is higher than the number Q of connectors is given by:

$$B = Q + 1 + \text{integral part } (A/P) \qquad (3)$$

The summing unit 530 comprises Q selecting circuits 56.1 . . . 56.Q having a plurality of inputs and one output. The number of inputs corresponds to the number of adjacent memory blocks which is equal to 1+integral part (A/P). These circuits serve to switch a single memory output towards the operator and are controlled by the address generator as will be explained hereinafter.

Q samples of the same spatial channel are available at the same instant at the Q outputs $S_1, \ldots S_Q$ of the summing unit 530 and are placed in series by means of a multiplexer 54 on the single output V. Said samples are available for use, for example, in a visual display unit (not shown in the drawings).

Figure 6:
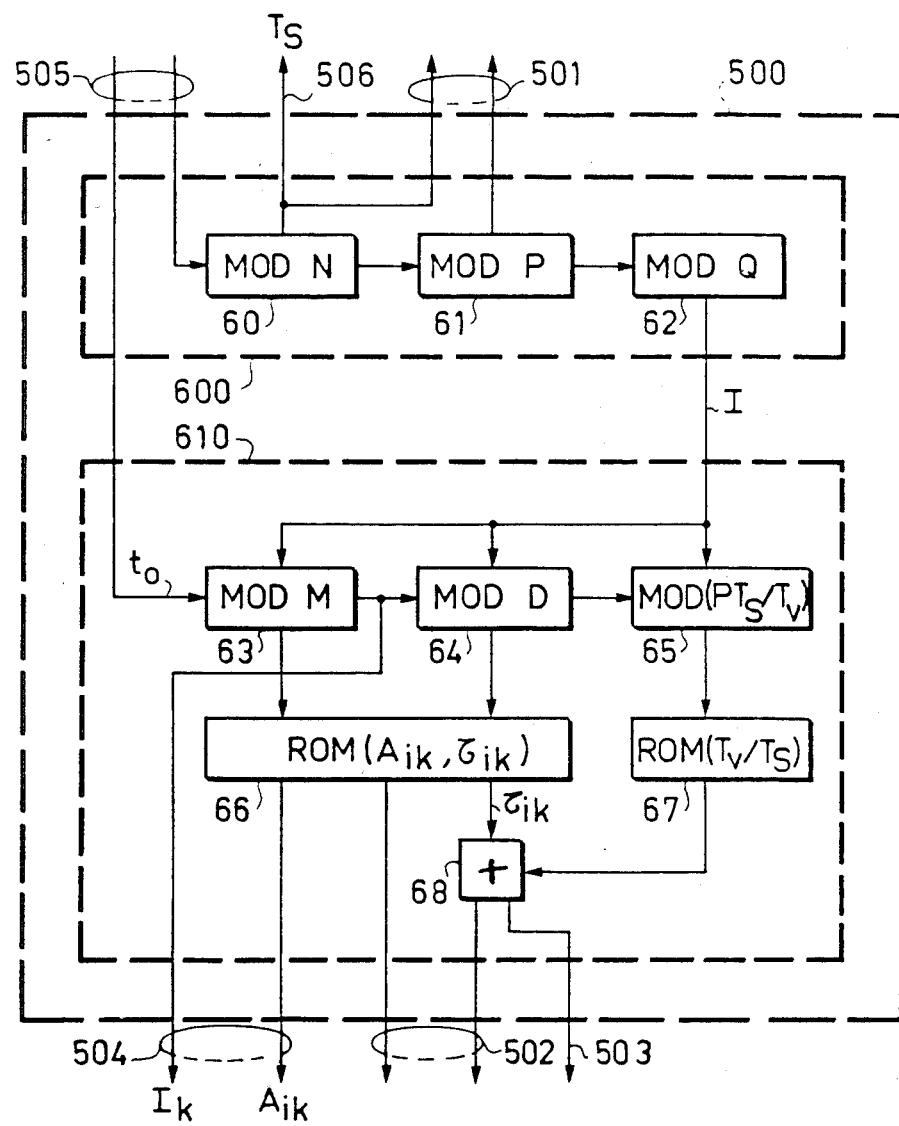
FIG. 6 is a diagram of the address generator for the channel formation device in accordance with the invention.

The address generator is shown diagrammatically in FIG. 6 and comprises two networks. The first network 600 generates the addresses of the acquisition memory blocks, the writing and reading frequency of which is equal to $N/T_S$. The second network 610 delivers the addresses of the channel-formation memory blocks.

The first network comprises a modulo N counter 60 which receives at 505 the clock signal at the frequency $N/T_S$ and which delivers at the output 506 the period $T_S$ for the multiplexer 10 (FIG. 5). The write addresses in the acquisition memory 510 are delivered at the output 501 by the modulo N counter 60 and a modulo P counter 61 which receives the output signals of the counter 60. The output signal of the modulo P counter is applied to a modulo Q counter 62 which delivers at its output the initialization signal I for the second network 610.

When the number N of sensors constituting the antenna is a power of 2, the construction of the first address-generating network is simplified.

The second address-generating network comprises a modulo M counter 63 which receives at 505 the clock signals at the period $t_o$. A modulo D counter 64, where D is the number of channels to be formed, receives the output signals of the counter 63. The two counters 63 and 64 deliver the addresses applied to a read-only memory (ROM) 66 which contains the table of electrical delays $\tau_{ik}$, the indices "i" of the sensors to be employed and the amplitude weighting coefficient $A_{ik}$ to be applied to the signals in accordance with relation (1). A third modulo $PT_S/T_v$ counter 65 supplied by the counter 64 produces a shift which is added at 68 to $\tau_{ik}$ in order to obtain the true delay. The shift increases by the quantity $T_v/T_S$ delivered by the memory 67 at each pulse of the counter 64. The read-only memory 67 or ROM is supplied by the output of the counter 65. The high-order bits delivered by the adder 68 and corresponding to capacity overflow of the formation memory block are employed for controlling the memory-block selectors at 503.

The addresses are provided on the one hand at the output 503 for approximate preliminary addressing at the selectors 56.1, . . . 56.Q and on the other hand at 502 for modulo NP fine addressing at the formation memories 52.1, . . . 52.Q. The output 504 delivers the amplitude weights and a zero-reset signal $I_k$ controlled by the modulo M counter 63.

Figure 4:
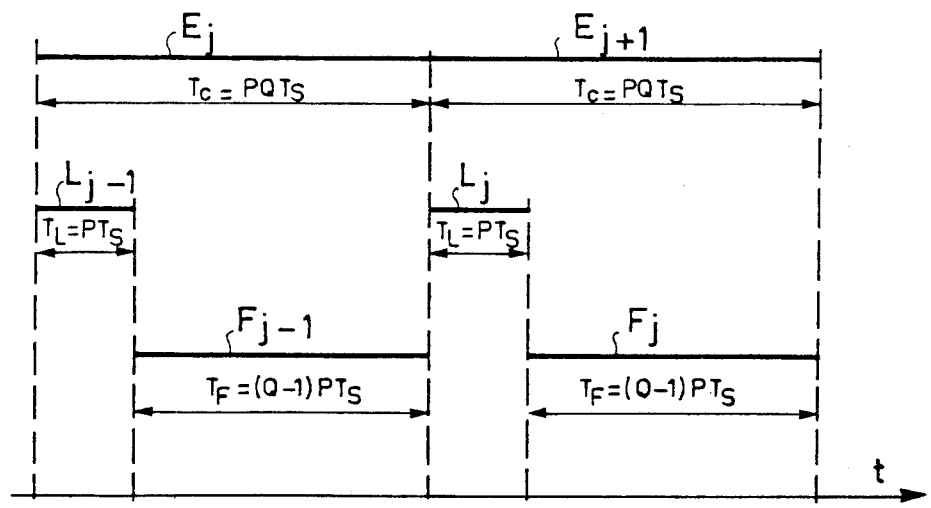
FIG. 4 is a time representation of the read/write cycles in accordance with the invention.
Figure 7:
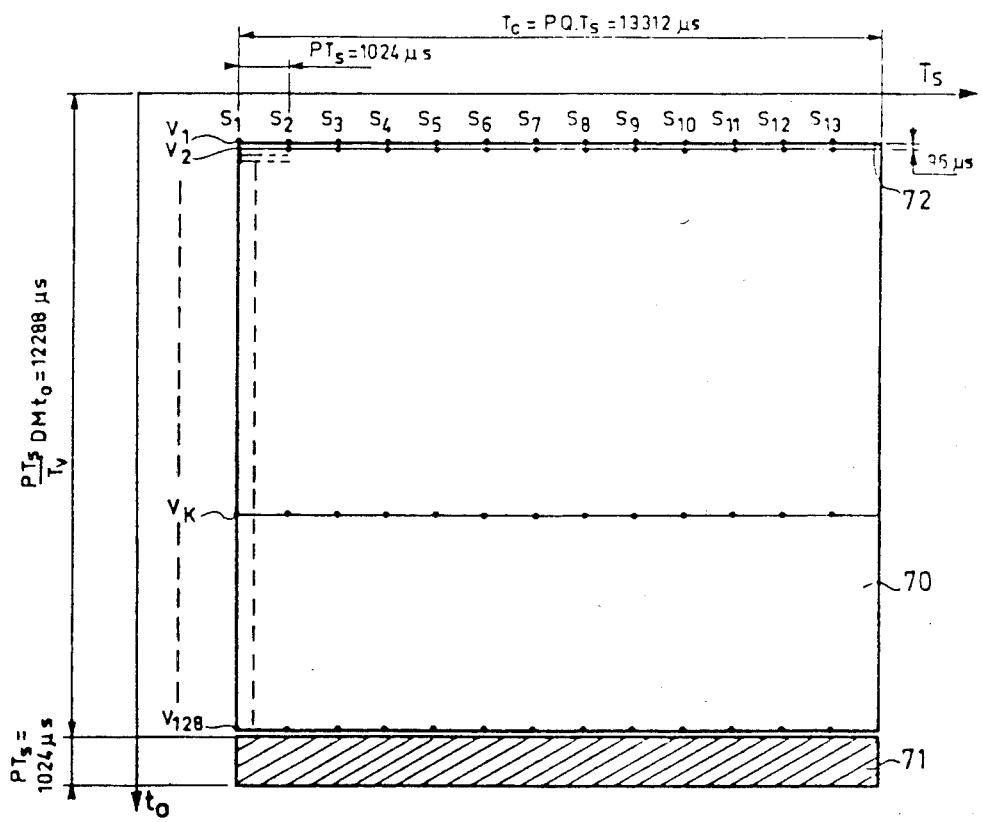
FIGS. 7 and 8 are time diagrams of the formed channels in accordance with the invention.
Figure 8:
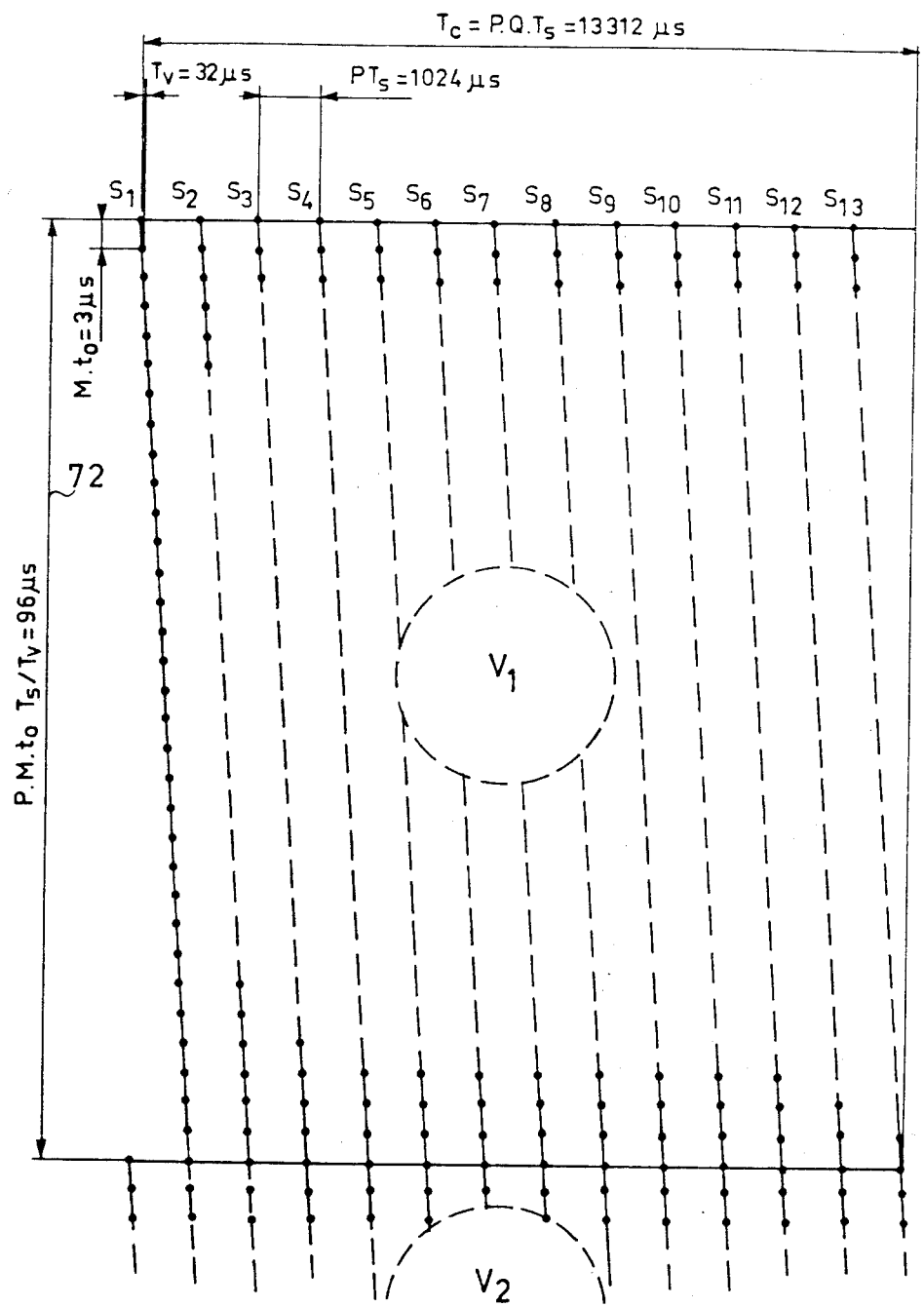

The operation of the device in accordance with the invention is shown diagrammatically in FIGS. 4, 7 and 8.

The acquisition memory 510 continuously acquires the samples of the sensors at the rate $T_S/N$. The acquisition memory stores a time interval T of the signal of each sensor which is equal to $BPT_S$, the value of which is greater than the transducer array depth $A.T_S$.

Since the number of samples per block 51.m is equal to N.P, filling of a block is carried out within a time interval $PT_S$. As indicated in FIG. 4, the device operates in cycles each having a time-duration $T_c$ which corresponds to the time required to renew the sensor samples. During each cycle $T_c$, Q blocks of the acquisition memory are filled, with the result that $T_c = PQT_S$.

The two acquisition and formation memories operate in cycles having a time-duration $T_c$.

A cycle begins by transferring the contents of the memory blocks 51.1 . . . 51.B into the memory blocks 52.1 ... 52.B. This operation is carried out block by block and the blocks 51.m receive the same addresses as the blocks 52.m. This stage $L_j$ has a time-duration $T_L = PT_S$ and the operation of the acquisition memory is not modified during loading of the formation memory. During this transfer stage, the formation memory 520 receives the addresses from the first network of the address generator 500.

At the end of the transfer stage $L_j$, the memory 520 is employed in a read-only operation for forming channels during the formation stage $F_j$. The time-duration $T_F$ of this stage is $F_j$.

During the cycle corresponding to acquisition of the sensor samples $E_j$, there is carried out the transfer $L_{j-1}$ of the sensor samples $E_{j-1}$ followed by the formation of the channel samples $F_{j-1}$.

During the cycle corresponding to acquisition of the sensor samples $E_{j+1}$, there is carried out the transfer $L_j$ of the sensor samples $E_j$ followed by formation of the channel samples $F_j$.

Since the number B of memory blocks is greater than the number Q of operators, there is a time-duration overlap $(B-Q).P.T_S$ between the time intervals transferred into the formation memory for each cycle having a a time-duration $Q.P.T_S$. If the transducer array depth $AT_S$ is smaller than $PT_S$, we have $B=Q+1$ and there is at least one time-duration overlap $PT_S$.

During the formation stage $F_j$, the operating frequencies of the two networks 600 and 610 of the address generator can be different, in which case the second network receives the initialization order I at the end of the transfer operation.

As a general rule, the channel-formation circuit is specified for the formation of a predetermined number D of spatial channels $V_k(t)$ which are sampled at the period $T_v$, each channel being formed from M sensors. Given the known fact that memory components having an access time or elementary cycle $t_o$ are employed, it is possible to deduce therefrom the number Q of formation circuits to be employed in order to obtain simultaneously Q time samples of one and the same spatial channel.

In fact, during a cycle $T_c$, the device delivers Q samples of the same spatial channel displaced in time by $PT_S$, namely $V_k(t)$, $V_k(t-PT_S)$ ... $V_k(t-T_c)$. In the case of each spatial channel, it is necessary to compute $PT_S/T_v$ channel samples including the intermediate samples.

Computation of a channel sample, either of the same spatial channel or of a different spatial channel, has a time-duration equal to $Mt_o$. The duration of computation of $PT_S/T_v$ channel samples in respect of D channels is therefore equal to $(PT_S/T_v) DMt_o$. The equality of the time interval $T_c$ and of said computation interval provides the number Q of formation circuits, namely:

$$Q = 1 + D.M.t_o/T_v \qquad (4)$$

This number is independent of the size NP of the acquisition and formation memory blocks. Only the number B−Q of additional memory blocks depends on said size and on the transducer array depth A expressed in periods of sampling of the sensors. B−Q is deduced from relation (3).

In order to gain a more complete understanding of the operation, reference will be made to FIGS. 7 and 8 which are horizontal representations of the instants in periods $T_S$ as a function, vertically, of the instants counted in elementary cycles $t_o$ in the case of channel samples computed during each cycle $T_c$. The portion 70 corresponds to the computing stage and the portion 71 corresponds to the transfer stage.

In these figures, the samples are represented by points. FIG. 8 is a detail of the vertical scale of the portion 72 of FIG. 7 which corresponds, for example, to the cycle of computation of all the samples of the spatial channel $V_1$.

The values corresponding to the example of application which is chosen are as follows:

$T_S$ = period of sampling of the received signals = 16 μs $T_v$ = period of sampling of the formed channels = 32 μs $t_o$ = time-duration of an elementary cycle of the formation memory = 0.125 μs D = number of formed channels = 128

N = number of sensors = 64

M = number of sensors employed for one channel = 24

A = transducer array depth = $83T_S$, namely a mean depth of two meters memory capacity = 4096 words, namely NP = 4096, P = 64

In this example there are obtained:

Q = number of formation circuits = 13

B = number of memory blocks = 15

$T_c$ = period of renewal of sensor samples in Q blocks of the acquisition memory = 13312 μs $PT_S/T_v = 32$ The time interval between two channel sample outputs is $Mt_o = 3$ μs. In consequence, the frequency of the multiplexer 54 is greater than $1/Mt_o$.

Each operator has access to $B-Q+1=3$ adjacent blocks.

As shown in FIGS. 7 and 8, computation is performed on all the samples of one and the same spatial channel $V_k$ which are shifted in time by $T_v$, then all the samples of the spatial channel $k+1$, and so on.

In accordance with an alternative mode of operation, it is possible to modify the order of computation of the channel samples. For example, after having computed the first thirteen samples of channel $V_1$ of FIG. 8, the first thirteen samples of channel $V_2$ are then computed, and so on up to channel $V_{128}$. There are then computed the second line of the channel $V_1$ followed by the second line of channel $V_2$, and so on. Consideration can also be given to other variants in which these two orders of computation are combined.

In the case of the address generator as described earlier, the directions of the D spatial channels are fixed with respect to the transducer array. It is possible to form channels in directions which are variable in time, either for the purpose of compensating the movements of the platform which supports the transducer array or for the pursuit of moving sources. To this end the read-only memory (ROM) 66 which contains the sensor addresses i and $\tau_{ik}$ must be replaced by a volatile memory which is periodically refreshed by a computer receiving the position parameters of said moving platform. Thus a channel $V_k$ being defined for example by absolute spherical coordinates and the angles of rotation of the ship being measured, a computer determines the spherical coordinates of the channels relative to the ship. On the basis of these values and the geometry of the transducer array being known, the computer determines the values of $\tau_{ik}$ which are stored in the volatile memory. This period of renewal must be equal to, or a multiple of, the time interval of the cycle $T_c$ during which the channel formation circuits compute a number of time samples of the same channel simultaneously. In the numerical application mentioned earlier, the duration of the cycle $T_c$ is of the order of 13 milliseconds, which would make it possible to maintain accuracy of pointing to within 0.1 degree up to angular velocities of 7.5 degrees per second.

The device in accordance with the invention is particularly advantageous for the formation of the surveillance channels of a sonar which makes use of a conformal transducer array, that is, an array which conforms to the shape of the ship or submarine. By again making use of the foregoing numerical application in the event that the input signals are one-bit coded by waveform clipping and by using random-access memory units having a capacity of 4096 words of 4 bits, a volume on the order of one hundred units is attained for input multiplexing, for channel formation and for the address generator.

In accordance with the prior art, the number of memory units would have been of the order of 250 units by making the most effective use of left-right symmetry which usually exists in a conformal transducer array.

What is claimed is:

1. A digital device for forming of spatial channels for a sonar having an acoustic transducer array comprising N sensor which deliver N sensor signals, said device comprising:
   means for sampling and time multiplexing in series the N sensor signals;
   storage means, having a plurality of memory blocks, for sequentially storing the samples of the N sensor signals;
   addressing means for supplying a series of reading addresses to the memory blocks, all the memory blocks receiving the same address at the same time;
   summing means, coupled to said memory blocks, for calculating in parallel, Q values for each spatial channel, each value being calculated as a function of a series of samples of the N sensor signals, each series of samples being read respectively in the memory blocks at the series of addresses supplied by the addressing means; and
   means for storing the Q values calculated in parallel for each channel and restoring them in a series constituting signal values of a spatial channel of the sonar.

2. A channel formation device according to claim 1, wherein each sensor signal is sampled with a sampling period $T_S$, samples of order i being delayed in order to form a spatial channel $V_k$ having a delay $\tau_{ik}$ whose maximum value is $\tau_m$, and wherein said transducer array has a depth $A = \tau_m/T_S$, and wherein the storage means make it possible to store, in the case of each sensor, samples of a time interval which is greater than said depth.

3. A channel formation device according to claim 2, wherein the memory blocks all have the same capacity and each one can store P groups of N samples, P being greater or equal to A, and the memory blocks are mounted in series, the values stored within one memory block being transferred to the next block.

4. A channel formation device according to claim 2, wherein said memory blocks include a first assembly of B memory blocks which are used to perform acquisition of the sensor samples over a time interval $T_c$, and a second assembly of B memory blocks in which each memory block of the first assembly is connected to a memory block of the second assembly, said addressing means permitting simultaneous reading of the samples from the B memory blocks of the second assembly in order to deliver delayed samples to the summing means, and said summing means delivering simultaneous time samples of the same channel which are spaced at a distance of $PT_S$, the first assembly being designated as an acquisition memory and the second assembly being designated as a formation memory.

5. A channel formation device according to claim 4, wherein said means for sampling and multiplexing include a multiplexer continuously delivering the samples of the sensor signals at the rate of $T_S/N$, the B memory blocks of the acquisition memory are read at the same address supplied by the addressing means, the contents of one memory block including NP samples are transferred into a following memory block, write addresses being the same for all said memory blocks, a first memory block receiving the signal delivered by the multiplexer.

6. A device according to claim 5, wherein the formation memory delivers simultaneously Q samples of one and the same channel, said device operating in accordance with cycles each having a time-duration $T_c = QPT_S$ and forming D spatial channels $V_k$ during said cycle.

7. A device according to claim 6 further including buffer memories connected to the acquisition memory blocks for receiving the contents of said acquisition blocks during a time interval $T_L = PT_S$ and transferring said contents to the formation memory blocks, said formation memory blocks being intended to receive one and the same addressing signal.

8. A formation device according to claim 7, wherein the D spatial channels $V_k$ are all formed during a period $T_F = T_c - T_L$ of a predetermined cycle from samples of the formation memory which have been acquired during the preceding cycle.

9. A device according to claim 8, wherein M is a number of sensor signals employed for the formation of one channel, $t_o$ is a period of reading of one sample in the memory blocks, $T_v$ is a period of sampling of each channel, and the number Q of samples obtained simultaneously in each channel is given by: $Q = 1 + DMt_o/T_v$.

10. A channel formation device according to claim 9, wherein the number B of memory blocks of the acquisition memory and of the formation memory is given by the relation: $B = Q + 1 + $ integral part $(A/P)$.

11. A channel formation device according to claim 10, wherein the addressing means comprise a first addressing assembly comprising:
   modulo N counters, modulo P and modulo Q counters in series for delivering control pulses to the multiplexer, write addresses to the acquisition memory, and an initialization signal I; and
   a second addressing assembly for receiving said initialization signal and comprising modulo M, modulo D and modulo $PT_S/T_v$ counters, a random-access memory for storing the values of the delays $\tau_{ik}$ and weighting coefficients $A_{ik}$, a random-access memory for storing the ratio $T_v/T_S$ and a summation device for receiving the values of $\tau_{ik}$ and of $T_v/T_S$ and which delivers a selection signal, said addressing second assembly delivering read addresses into the formation memory and providing the weighting values $A_{ik}$ of the samples.

12. A channel formation device according to claim 11, further including a clock which is identical in both assemblies of the addressing means.

13. A channel formation device according to claim 11, further including two clocks which are different in each of the two assemblies of the addressing means.

14. A channel formation device according to claim 11 wherein, during the formation cycle $T_F$ having a time-duration (Q-1) $PT_S$, the addressing means delivers successively read addresses corresponding to $PMT_S/T_v$ samples of one and the same channel and thus successively in the case of all the D channels.

15. A channel formation device according to claim 11 wherein, during the formation cycle having a time-duration $T_F$, the addressing means delivers in succession the read addresses corresponding to DM samples of all the channels and so on in succession in the case of the $PT_S/T_v$ intermediate samples of the channels.

* * * * *